UNITED STATES PATENT OFFICE 2,497,234

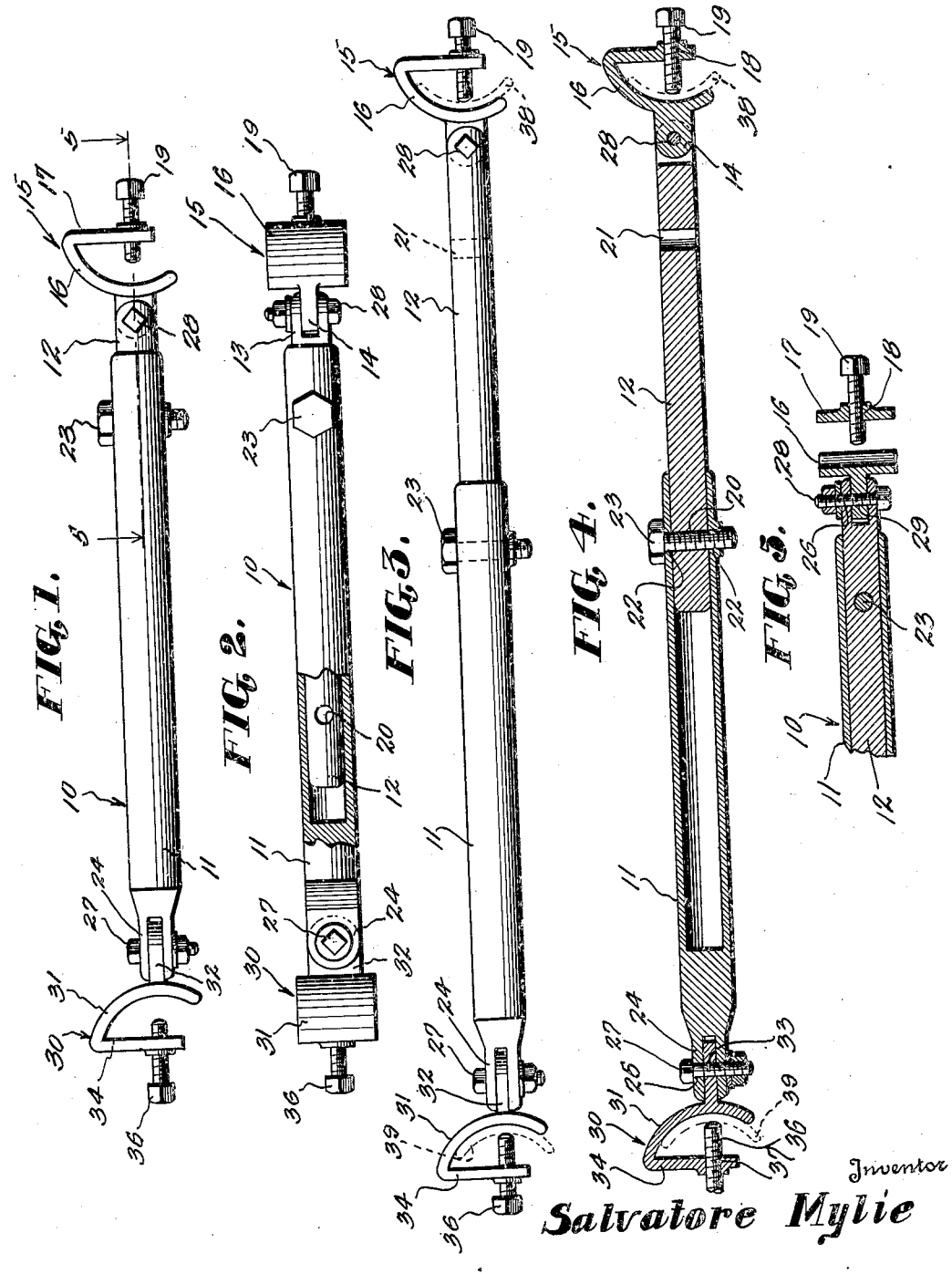

TOW BAR

Salvatore Mylie, Eureka, Calif.

Application March 24, 1947, Serial No. 736,645

1 Claim. (Cl. 280—33.14)

This invention relates generally to improvements in towing devices and particularly a towing device designed for use in connection with motor vehicles.

A principal object of the present invention is to provide an extensible tow bar which may be shortened and conveniently carried in the tool compartment of a motor vehicle and which, when needed for use, can be extended to a substantial length and rigidly coupled between adjacent front and rear bumpers of two motor vehicles placed one in front of the other, whereby the forward vehicle may be able to draw or tow the rear vehicle safely and without danger of damaging either vehicle by the same coming together and also without danger of damaging the transmission or other parts of the driving mechanism of the towing machine.

Another object of the invention is to provide an extensible tow bar of the character described wherein there are provided clamp units at opposite ends, one of which is designed to oscillate on a horizontal axis and the other being designed to oscillate or turn on a vertical axis thereby providing for right and left turns of the draft or tow vehicle and also providing for any relative up and down movement between the vehicles.

The invention will be best understood from a consideration of the following detailed description taken in connection with the accompanying drawing forming a part of the specification, with the understanding, however, that the invention is not to be understood as limited to the exact details of construction shown and described since obvious modifications will occur to a person skilled in the art.

In the drawing:

Figure 1 is a view in side elevation of a tow bar constructed in accordance with the present invention, showing the same shortened or collapsed whereby it may be conveniently carried in the motor vehicle.

Figure 2 is a view in top plan of the same, a portion of one unit being broken away.

Figure 3 is a view in side elevation of the tow bar showing the same extended to its full length and showing in dotted outline the manner in which the adjacent bumpers of two cars are secured to the clamps of the tow bar.

Figure 4 is a vertical longitudinal section of the bar extended as shown in Figure 3.

Figure 5 is a sectional view taken substantially on the line 5—5 of Figure 1.

Referring now more particularly to the drawing the bar which is generally designated 10, comprises a section 11 which is tubular throughout the major portion of its length, and a section 12 which is of solid bar form and may be of circular cross section or of polygonal cross section as may be desired.

The outer end of the solid section 12 of the tow bar is slotted to form the spaced ears 13 and between these ears is pivotally positioned a single ear 14 forming an integral part of a clamp which is generally designated 15. This clamp 15 comprises an inner portion 16 which is arcuate in cross section and defines slightly less than half a circle. One longitudinal edge of the arcuate portion 16 of the clamp 15 is integral with the outer portion 17 which is in the form of a plate which extends across the concave forward side of the part 16 as shown in Figures 1, 3 and 4. This plate 17 has a threaded aperture 18 which may be aligned with the center of the bar section 12 and threaded in this aperture is the clamp screw 19 which may be extended inwardly toward the concave surface of the part 16.

The bar section 12 has two transverse apertures 20 and 21 and these are adapted to be brought into alignment with the openings 22 which are formed through and aligned transversely of the end of the tubular section 11 into which the section 12 is slidably extended.

Adapted for extension through the transversely aligned opening 22 is a screw or bolt 23 which is threaded for threaded engagement in one of the openings 22. This screw or bolt is also adapted to pass freely through one of the openings 20 and 21 of the bar section 12. Thus it will be seen that when the bar section 12 is fully extended into the tubular section 11 the opening 21 will be brought into alignment with the openings 22 so that the bolt or screw 23 may be passed through the opening 21 and thus secure the two sections of the tow bar in folded or collapsed relation. When the tow bar is to be used the screw 23 is removed and the section 12 is drawn outwardly until the opening 20 is brought into alignment with the openings 22 whereupon the screw 23 is inserted as shown in Figure 4 and the bar is ready for use.

The end of the bar section 11 opposite from the open end in which the bar 12 is inserted, is solid as shown in Figure 4 and this solid end is slightly reduced in diameter and formed to provide the two spaced ears 24. These ears 24 are provided with transverse aligned apertures 25 and correspondingly the ears 13 are provided with transverse aligned apertures 26, the aligned apertures 25 and those apertures 26 formed through the ears 13 being designed respectively to receive bolts 27 and 28.

Since the ear 14 of the clamp 15 is also apertured as indicated at 29 the bolt 28 functions as a pivot for the clamp 15 since it passes through the aperture 29 as shown in Figure 5.

The numeral 30 designates a clamp unit of the same form as the clamp 15. This clamp unit comprises the inner arcuate portion 31 with which is integrally formed the single hinge or pivot ear 32 which positions between the spaced ears 24 and is apertured as indicated at 33 to have the bolt 27 pass therethrough. By this means the clamp 30 is pivotally attached to the draw bar.

The clamp 30 also includes the plate portion 34 which is integral with one edge of the arcuate portion 31 and extends across the concave face of the latter portion. This plate portion 34 carries the clamp screw 35 which is threaded through the aperture 36 in the plate 34 and is directed on the longitudinal center of the tow bar.

It will be readily seen upon examination of the figures of the drawing that the apertures 20 and 21 formed through the bar section 12 are at right angles to the pivot bolt 28. Accordingly when the bolt or screw 23 is extended through one of the openings 20 or 21 to couple the two sections of the tow bar together, the pivot bolt 28 will be at right angles to the bolt 27.

The numerals 38 and 39 designate dotted outline representations of a cross section of a motor vehicle bumper. Such bumpers are usually of arcuate cross section and accordingly as will be readily apparent the bumper is adapted to position in and engage against the concave inner face of the arcuate portion of a clamp. It will be accordingly readily understood that in the use of the present device one clamp, such, for example, as the clamp 15 will be engaged with the rear bumper of the front one of two cars positioned one behind the other while the other clamp 30 will be engaged with the front bumper of the rear car. The screws 19 and 36 are extended inwardly toward the adjacent bumpers and will secure the bumpers in the concave portions of the adjacent curved clamp plates. Thus it will be apparent that a car may draw or tow another one and the cars will be at all times maintained in properly spaced relation so that it will be impossible for the rear car to run up onto the forward car and cause any damage. Also by reason of the fact that there is a rigid connection between the cars no unusual jerks or sudden pulls will be applied to the front car and no damage to the differential or transmission mechanism will result such as might result if a flexible tow rope were being employed.

By providing the extensible bar a sufficient space can be maintained between two cars to allow for proper flexibility of the connection so that the front car can turn and danger of the rear part of the front or tow car striking the forward part of the rear car is eliminated.

When the tow bar is not in use the bolt or screw 23 is removed and the section 12 is pushed or moved into the tubular section 11 whereupon the bolt or screw 23 is replaced to extend through the opening 21 and thus hold the parts of the tow bar together with the bar in shortened relation convenient for storage under a seat or in a tool compartment of a vehicle.

I claim:

A tow bar of rigid form comprising two relatively long bar sections adjustably coupled together for longitudinal lengthening and shortening, a clamp unit coupled to each of the remote ends of the two bar sections, one of said clamp units being pivoted for free turning relative to the bar on a vertical axis and the other clamp unit being pivoted for free turning relative to the bar on a horizontal axis, that clamp unit which turns on the vertical axis comprising a longitudinally arcuate member, a long plate joined at one end to an end of the arcuate member to extending across the concave side thereof and a clamp screw threaded through the plate toward the arcuate member, the length of the arcuate member and plate being in the same direction as the pivot axis, and the other clamp comprising a longitudinally arcuate member, a long plate attached at one end to an end of the arcuate member and extending across the concave side thereof and a clamp screw threaded through the plate toward the arcuate member, the length of the arcuate member and plate of the said other clamp being transverse to the pivot axis thereof.

SALVATORE MYLIE.

REFERENCES CITED

The following references are of record in the file of this patent:

UNITED STATES PATENTS

| Number | Name | Date |
|---|---|---|
| 2,092,593 | Seys | Sept. 7, 1937 |
| 2,189,667 | Kries | Feb. 6, 1940 |
| 2,243,347 | Klein et al. | May 27, 1941 |
| 2,384,245 | Forney | Sept. 4, 1945 |

FOREIGN PATENTS

| Number | Country | Date |
|---|---|---|
| 577,987 | Germany | June 8, 1933 |